United States Patent Office 3,217,748
Patented Nov. 16, 1965

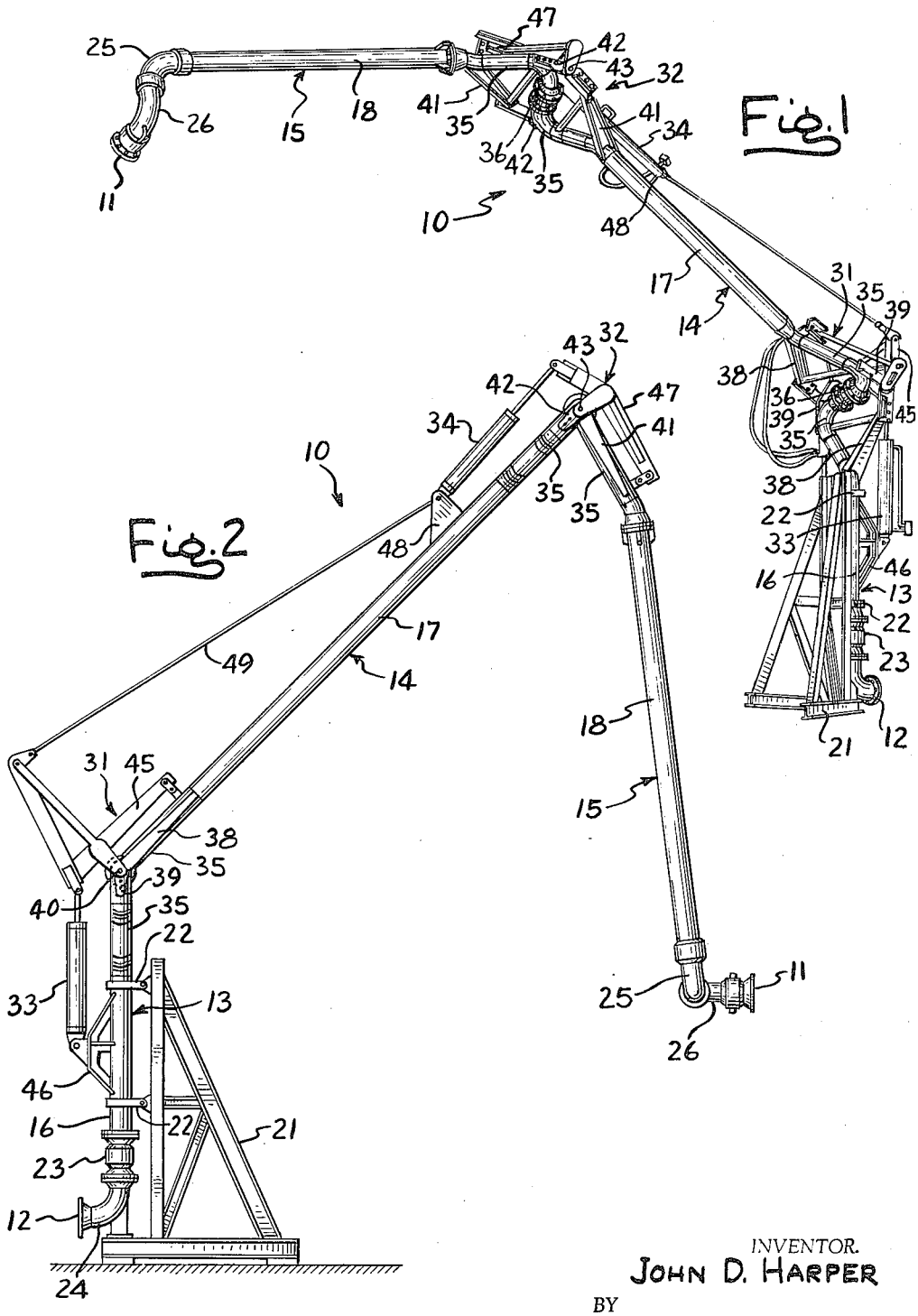

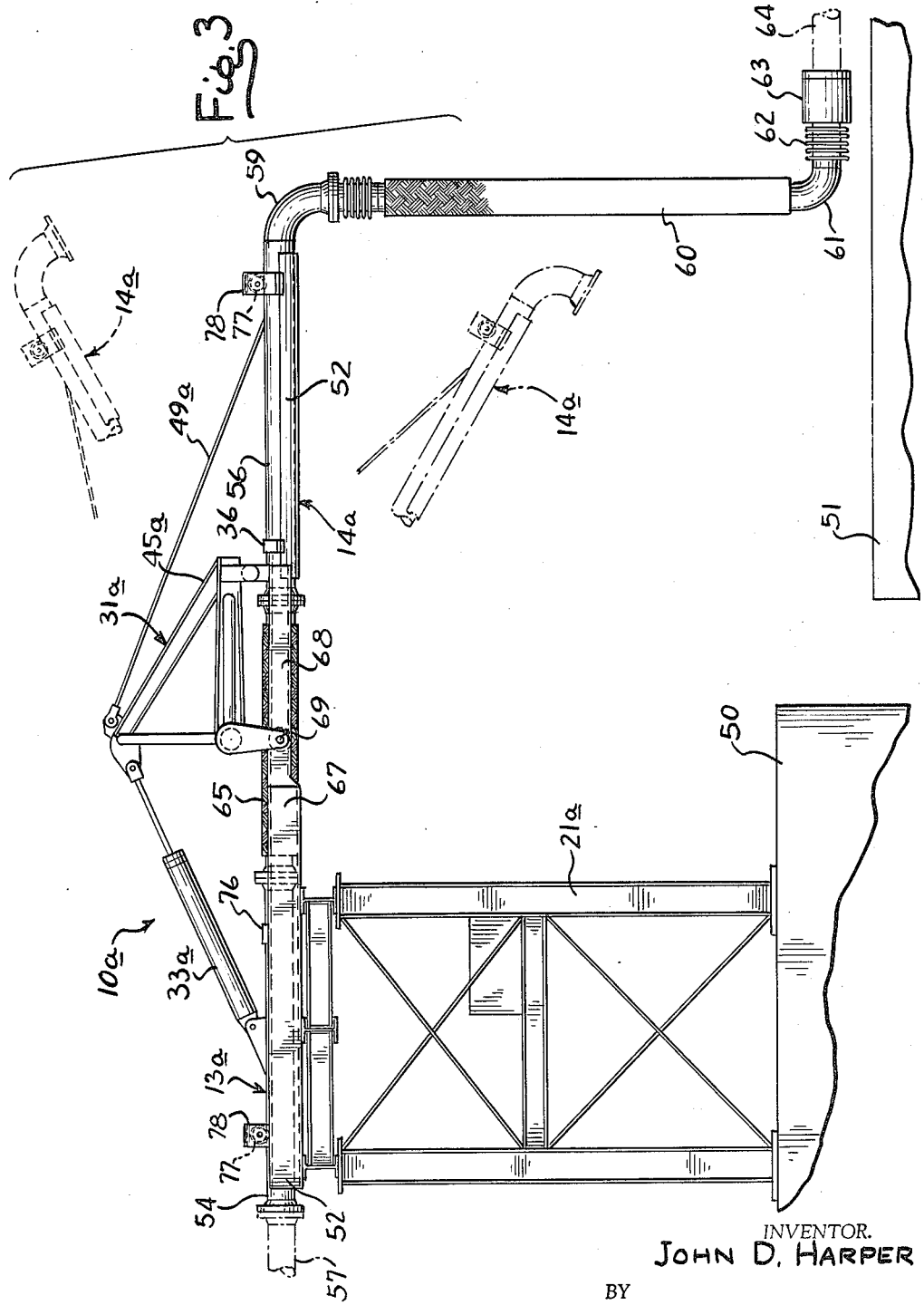

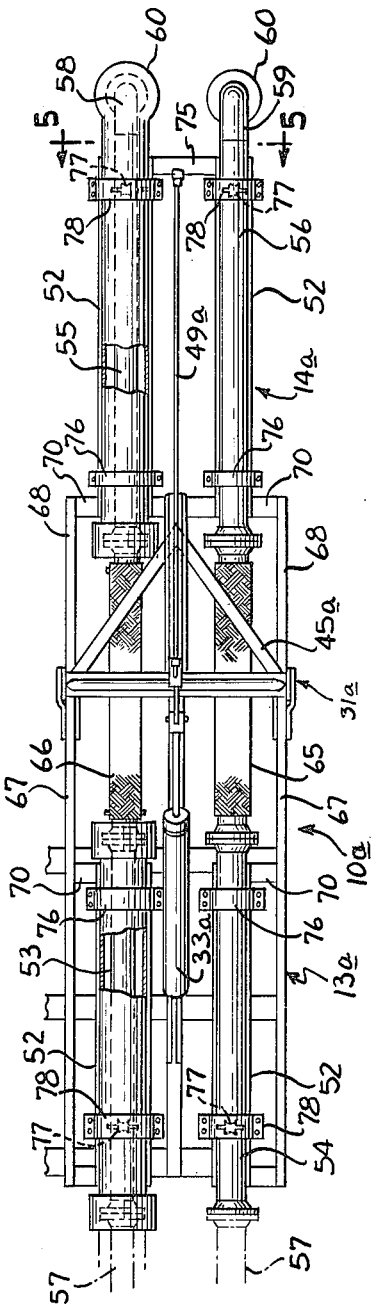
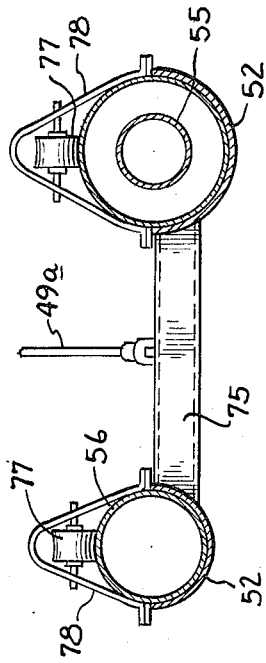

3,217,748
FLEXIBLE INSULATED FLUID TRANSFER
APPARATUS
John D. Harper, Elgin, Ill.
(111 W. Washington St., Chicago 2, Ill.)
Filed June 26, 1963, Ser. No. 290,810
2 Claims. (Cl. 137—615)

This invention relates generally to fluid transfer apparatus and more particularly concerns articulated, controlled position piping for transferring fluid material between relatively movable containers.

Apparatus of this kind is used for transferring fluids to and from mobile tanks on railroad cars or trucks, between ships, barges and the like, or between fixed installations and a mobile carrier. As used herein, the term "fluid" embraces not only gases and liquids but any other condition that permits material to flow, such as a finely particulated solid.

An effective apparatus of this kind must be both readily positionable and flexible so as to establish the initial connection between the desired terminal points and permit some relative movement between the terminal points during fluid transfer. Such relative movement is most severe when one of the terminal points is water-borne, i.e., a ship or barge. It has been proposed to form apparatus of this kind by articulating a number of pipes or conduits so that each length pivots the adjacent unit for rotation about at least one axis. In such an apparatus, control is achieved by utilizing a motor or actuator at one or more of the articulated joints so that, by driving the actuators, the joined piping can be maneuvered snake-like into position with the joints providing the required flexibility which is maintained during fluid transfer.

With apparatus of some length, or when using heavier piping, the cantilevered weight can impose considerable stress on the articulated joints. Also, a pipe-to-pipe rotatable joint is unsuitable for transferring cryogenic materials whose temperatures run more than 150° below zero centigrade. At such temperatures, joints stick, gaskets crack and there is considerable likelihood of leakage which, of course, cannot be permitted.

Accordingly, it is an object of the invention to provide, in an apparatus of the above kind, an improved assembly for articulating pipe or conduit which is capable of supporting substantial loads and which facilitates the use of a common linear actuator for controlling flexure at the joint.

It is also an object to provide an assembly as characterized above that permits flexible lengths of suitable hose to be substituted for a pipe-to-pipe rotatable joint so that the transfer apparatus can efficiently handle cryogenic materials.

Another object is to provide apparatus of the type described above which is particularly well suited for cryogenic applications in that resilient gaskets or seals are eliminated, heat absorbing connections are minimized, and analysis of dimensional changes caused by extreme temperature variations are simplified.

Other objects and advantages of the invention will become apparent upon reading the following detailed description and upon reference to the drawings, in which:

FIGURE 1 is a perspective of a transfer apparatus embodying the present invention;
FIG. 2 is a side elevation of the apparatus shown in FIG. 1;
FIG. 3 is a side elevation of a second form of fluid transfer apparatus also embodying the invention;
FIG. 4 is a plan of the apparatus shown in FIG. 3; and
FIG. 5 is an enlarged fragmentary section taken approximately along the line 5—5 in FIG. 4.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning now to FIGS. 1 and 2, there is shown a fluid transfer apparatus 10 embodying the invention and adapted to transfer fluid between a first flanged coupler 11 and a second flanged coupler 12. The apparatus 10 includes three elongated conduit units 13, 14 and 15. In this embodiment, the conduit units 13–15 essentially comprise elongated pipes 16, 17 and 18, respectively.

The conduit unit 13 is held in a substantially vertical position by a frame 21 to which the pipe 16 is rotatably secured by a pair of straps 22. This rotatable connection permits the entire apparatus 10 to rotate about a vertical axis on the frame 21. The flanged coupler 12 is secured to the lower end of the pipe 16 by a rotatable joint 23 and an elbow 24 so as to permit the coupler 12 to be secured to a fixed feeder line while allowing the apparatus 10 to swing relative to the coupler. The coupler 11 is secured to the outer end of the pipe 18 by an elbow 25 which is rotatably connected to both the pipe 18 and an elbow 26 carrying the coupler 11. This universal movement mounting of the coupler 11 facilitates connection of the outer end of the apparatus 10 to a tank or line which is relatively movable with respect to the frame 21.

In keeping with the invention, the units 13–15 are pivotally connected in fluid transfer relation for relative rotation about axes disposed generally at right angles to the adjacent ones of the units, and yoke assemblies 31 and 32 are provided to support the cantilevered weight and provide mounting points for position controlling actuators 33 and 34. In the embodiment under consideration, the pipes 16–18 have hooked tips 35 which are brought into face-to-face relation and secured by rotatable collars 36 to define fluid-tight joints between the pipes permitting relative rotation about transverse axes.

The yoke assembly 31 includes the hooked tips 35 which, together with arms 28 and brackets 39, define yokes at the adjacent ends of the pipes 16, 17 that straddle the intermediate joint between these pipes. Pivot pins 40 connect the yoke assemblies so that the conduit units 13 and 14 are pivoted for rotation about the axis of the pipe joint. Similarly, the yoke assembly 32 includes the adjacent hooked pipe tips 35 which, together with arms 41 and brackets 42, define yokes fixed to the adjacent ends of the pipes 17, 18 which straddle the intermediate pipe joint. Pins 43 join these yoke assemblies so that the conduit units 14 and 15 are pivoted for rotation about the axis of the interconnecting fluid-tight joint.

To provide control pursuant to the invention, the yoke assembly 31 includes a portion 45 extending laterally from the conduit unit 14 in a direction substantially at right angles to the adjacent axis, and the actuator 33 is fixed between the portion 45 and a bracket 46 on the conduit unit 13. The extending portion 45 is preferably a rigid truss framework. Similarly, the yoke assembly 32 includes a laterally extending truss portion 47 on the conduit unit 15 and the actuator 34 is secured between the portion 47 and a bracket 48 on the conduit 14. For added rigidity (a guy cable 49 is extended between the truss portion 45 and the bracket 48. In the preferred construction, the actuators 33 and 34 are of the linear, cylinder and piston type and may be either pneumatically or hydraulically powered.

It can be readily seen that supplying power to the actuators 33, 34, and manually swinging the apparatus 10 about the frame 21, permits a wide range of positionable movement between the couplers 11 and 12. Free pivotal movement between the conduit units 13–15 is readily achieved without strain on the intermediate pipe joints since the cantilever loads are borne by the yoke assemblies 31, 32. These yoke assemblies also permit the use of the economical linear actuators 33, 34 which provide effective and accurate positioning of the apparatus.

An embodiment of the invention particularly well suited for cryogenic transfer applications is shown in FIGS. 3 to 5 wherein parts corresponding to those previously described have been given identical reference numerals with the distinguishing suffix "a" added. Thus, there is shown an apparatus 10a including two conduit units 13a and 14a joined by a yoke assembly 31a. The conduit unit 13a is fixedly mounted through a frame 21a on a dock 50, and the conduit unit 14a extends from the dock 50 to overhang a barge 51.

In carrying out this aspect of the invention, the units 13a, 14a include cradles 52 which support pipe that is connected in fluid transfer relationship. The illustrated construction includes a pair of cradles 52 in each of the units 13a and 14a, with the unit 13a having a cradled vacuum insulated pipe 53 and a cradled noninsulated pipe 54. The conduit unit 14a similarly includes a cradled vacuum insulated pipe 55 and a cradled noninsulated pipe 56.

The inland ends of the pipes 53, 54 are connected to feed lines 57. The outer ends of the pipes 55, 56 are connected, through elbows 58 and 59, respectively, to depending lengths of flexible insulated hose 60, preferably of the double wall metal type. The hoses 60 end in elbows 61 that carry gimbal joints 62 and couplers 63 that connect to barge feed lines 64. The hose 60 connected to the pipe 55 is preferably of the vacuum insulated, double wall type so as to continue the vacuum insulation.

Fluid-tight joints are provided between the conduit units 13a, 14a by lengths of flexible hose 65 and 66 which again are preferably of the double wall metal type. The hose 66 is vacuum insulated to continue this form of insulation between the pipes 53 and 55.

The yoke assembly 31a includes side plates 67 and 68 forming, respectively, portions of the conduit units 13a and 14a, with the side plates being overlapped and secured by pivot pins 69. Cross pieces 70 extend inwardly from the side plates 67, 68 to support the cradles 52. A rigid truss portion 45a extends laterally from and is rigidly fixed to the conduit unit 14a. An actuator 33a is coupled between the truss portion 45a and the conduit unit 13a so as to provide control of the relative pivoting movement between the conduit units 13a, 14a. A guy cable 49a extends from the top of the truss portion 45a to a cross piece 75 that is a part of the conduit unit 14a.

With the conduit units 13a, 14a in alinement as shown in FIG. 3, the pivot pins 69 define an axis that passes substantially through the intermediate connecting hoses 65, 66 so that complete flexibility is provided between the conduit units. Again, as in the apparatus 10, the cantilevered loads are borne in the apparatus 10a by the yoke assembly 31a with there being little or no strain on the fluid-tight connection between the pipes of the conduit units.

As a further feature of the invention, the pipes 53–56 are mounted in their respective cradles 52 for firm support while allowing considerable expansion and contraction variations between the pipes and their cradles. For this purpose, one end of each of the pipes 53–56 is secured to the supporting cradle by tightly secured straps 76 while the opposite ends of the pipes are held down into their cradles by rollers 77 allowing linear expansion of the pipes relative to the cradles. The rollers 77 are journalled within straps 78 secured to the respective cradles 52, and the roller peripheries are slightly concave so as to fit smoothly against the periphery of the respective pipes. The long areas of contact between the respective pipes and their cradles minimizes frictional resistance to contraction of the pipes relative to the cradles, and the journalled rollers 77 provide solid anchoring points while allowing the pipes to freely contract and expand relative to the cradles.

It can now be seen that the yoke assembly structure of the invention not only relieves the pipe joints in the apparatus 10 of undesirable stress and strain while providing anchoring locations for the linear actuators but also, when employed in a device such as the apparatus 10a, permits the use of flexible insulated hose in lieu of a pipe-to-pipe rotatable joint with the result that the apparatus can efficiently handle cryogenic materials. In such a construction, resilient gaskets or seals are eliminated and, hence, the danger of having such parts freeze or crack at extremely low temperatures is also eliminated.

Moreover, the cradle construction of the conduit units 13a, 14a permits the pipe elements themselves to adjust in length in accordance with their thermal coefficients of expansion and the temperature of the material being handled without interfering with the support or positioning structure of the apparatus 10a. Since the pipes are simply laid in cradles with support pressure provided only at the points of the straps 76 and 78, a minimum number of heat transferring connections are established between the pipes and the cradles and this, of course, minimizes the amount of heat absorbed by the material being transferred. There are no appurtenances or weldments fixed to the pipes that would constitute heat transfer locations.

I claim as my invention:

1. In a fluid transfer apparatus for cryogenic applications, the combination comprising, a first elongated conduit unit having a longitudinal axis and including a cradle supporting an insulated pipe, a second elongated conduit unit having a longitudinal axis and also including a cradle supporting an insulated pipe, a flexible insulated hose interconnecting said first unit pipe and said second unit pipe, a first yoke assembly fixed at the end of said first unit straddling said hose, a second yoke assembly fixed at the end of said second unit straddling said hose, said yoke assemblies being pivoted together for rotation about a pivot axis generally at right angles to, and at the intersection of, said longitudinal axes, said first yoke assembly including a portion extending laterally of said first unit in a direction substantially at right angles to said pivot axis, and an actuator extending between said laterally extending portion and said second unit for controlling relative movement between said units.

2. In a fluid transfer apparatus for cryogenic applications, the combination comprising, a first elongated conduit unit including a cradle supporting an insulated pipe, a second elongated conduit unit also including a cradle supporting an insulated pipe, a flexible insulated hose interconnecting said first unit pipe and said second unit pipe, a first yoke assembly fixed at the end of said first unit straddling said hose, a second yoke assembly fixed at the end of said second unit straddling said hose, said yoke assemblies being pivoted together for rotation about an axis generally at right angles to each of said elongated units, means clamping one end of each of said pipes into their respective cradles, and rollers holding the other end of each of said pipes into their respective cradles so as to anchor the pipes while allowing relative expansion and contraction between the pipes and the cradles.

References Cited by the Examiner

UNITED STATES PATENTS

| | | | |
|---|---|---|---|
| 1,392,955 | 10/1921 | Martin. | |
| 2,739,778 | 3/1956 | Krone | 137—615 X |
| 2,917,102 | 12/1959 | Mahady | 138—129 X |
| 2,969,092 | 1/1961 | Johnston | 138—149 |
| 3,021,867 | 2/1962 | Gallagher | 137—615 X |
| 3,032,070 | 5/1962 | Isenberg | 138—149 |
| 3,050,092 | 8/1962 | Palcanis | 137—615 |
| 3,096,797 | 7/1963 | Bily | 137—615 X |
| 3,126,913 | 3/1964 | Green | 137—615 |

FOREIGN PATENTS

| | | |
|---|---|---|
| 580,640 | 8/1959 | Canada. |
| 1,051,119 | 2/1959 | Germany. |

ISADOR WEIL, *Primary Examiner.*

WILLIAM F. O'DEA, *Examiner.*